United States Patent [19]

Rice et al.

[11] 4,440,918

[45] Apr. 3, 1984

[54] CONTACT LENS CONTAINING A FLUORINATED TELECHELIC POLYETHER

[75] Inventors: David E. Rice, Oakdale; Jay V. Ihlenfeld, St. Paul, both of Minn.

[73] Assignee: Minnesota Mining and Manufacturing Company, St. Paul, Minn.

[21] Appl. No.: 340,473

[22] Filed: Jan. 18, 1982

[51] Int. Cl.³ ............................ C08F 4/18; G02C 7/04
[52] U.S. Cl. ................................ 526/246; 351/160 R; 351/160 H; 526/247
[58] Field of Search ............... 526/320, 246, 247, 248; 351/160 R, 160 H

[56] References Cited

U.S. PATENT DOCUMENTS

| | | | |
|---|---|---|---|
| 3,397,191 | 8/1968 | Beckerbauer | 526/247 |
| 3,660,360 | 5/1972 | Ray-Chandhuri et al. | 526/246 |
| 3,766,251 | 10/1973 | Caporiccio et al. | 526/247 |
| 3,920,614 | 11/1975 | Kirimoto et al. | 526/246 |
| 4,109,070 | 8/1978 | Loshaek et al. | 526/320 |
| 4,143,017 | 3/1979 | Tarumi et al. | 526/320 |

*Primary Examiner*—Harry Wong, Jr.
*Attorney, Agent, or Firm*—Donald M. Sell; James A. Smith; James V. Lilly

[57] ABSTRACT

Ophthalmic devices of telechelic perfluorinated polyethers, and polymers and compositions for making such devices are disclosed. The devices possess improved oxygen permeability.

14 Claims, No Drawings

CONTACT LENS CONTAINING A FLUORINATED TELECHELIC POLYETHER

TECHNICAL FIELD

This invention is directed to ophthalmic devices, and polymers and compositions useful in such devices. More particularly it is directed to ophthalmic devices made from fluorinated telechelic polyethers, and certain polymers and compositions containing fluorinated telechelic polyethers.

As it is used herein, the term "telechelic polyether(s)" means polyether(s) having reactive groups, most commonly end groups, deliberately introduced onto the backbone of the polyether.

BACKGROUND ART

The use of various ophthalmic devices, such as those for insertion in or application directly on the eye, such as contact lenses and corneal implants, are known for the correction of vision difficulties. However, such devices have not been accepted by many people, in part because of the time often required by the eye to become accustomed to their use, the physiological intolerance that sometimes develops often after only short periods of use, or the inadequate visual acuity which may be provided by them.

These problems are more often encountered by people who either wear or have attempted to wear contact lenses. Consequently, a great amount of effort has been expended in attempts to solve these problems for the contact lens wearer.

These efforts have included modification in both the design of the lens and the composition of the lens material. Modifications in lens design so as to improve the fit of the lens to the eye has produced only marginal reduction of the physiological intolerance. Modification of the composition of the lens material has also only been partially successful.

Early contact lenses were made from polymethyl methacrylate (PMMA), a hard material that is not water-absorptive. PMMA lenses frequently cause a great deal of physical discomfort to the wearer. Lenses of PMMA, although they are readily machinable and have excellent optical clarity and durability, have a high level of physiological intolerance for many individuals partly because of the stiffness of the lens and partly because the eye becomes deprived of oxygen due to the low oxygen permeability of the poly(methylmethacrylate).

Lenses of soft water-absorptive hydrogel materials, such as poly(2-hydroxyethylmethacrylate) or poly(vinylpyrrolidone), produce reduction of irritation but at the cost of reduced visual acuity and greatly increased maintenance of the lenses. When such hydrogel lenses contain a high water content they have a high oxygen permeability and are, therefore, comfortable to wear. The high water content hydrogel lenses, however, have poor durability and exhibit a tendency to become cloudy due to absorption of proteinaceous material.

Lenses of silicone rubber are easily molded, are said to possess a softness similar to that of the upper lid of the human eye and have a high permeability to oxygen. However, contact lenses of silicon rubber may cause a burning sensation in the eye because of the low thermal conductivity of silicone rubber. Also, such lenses have been reported to sometimes tighten over the cornea in a "suction cup" fashion that impedes movement of the lens. This permits entrapment of toxic products and debris under the lenses and prevents tears from washing away this debris and lubricating the eyes, thereby causing abrasion of the eye. Furthermore, silicone rubber, being lipophilic, mucophilic, and inherently non-wettable, attracts debris, e.g., proteins, lipids, mucoids, and the like.

It is an object of this invention to provide contact lenses which do not have the disadvantages of the polymethyl methacrylate, silicone rubber, and hydrogel contact lenses.

DISCLOSURE OF THE INVENTION

The present invention overcomes these and other disadvantages. It provides ophthalmic devices, compositions, and polymers for making such devices. The ophthalmic devices of the invention include contact lenses and corneal implants.

The ophthalmic devices of the invention are mechanically strong, are resistant to absorption of tear components, and are highly permeable to oxygen. They comprise polymers of compositions containing up to 100 percent of telechelic polyether having a backbone of perfluorooxyalkylene units, a number average molecular weight between about 500 and 15,000, and at least one polymerizable ethylenically unsaturated group.

Preferably, the ophthalmic devices of the invention comprise copolymers of compositions containing (I) said telechelic polyether and (II) 2 to 50% by weight of copolymerizable ethylenically unsaturated comonomer.

Most preferably, ophthalmic devices of the invention have a wettable surface and comprise copolymers of the composition of the invention which comprises:
I. 50 to 88% by weight of said telechelic perfluoropolyether
II. 10 to 48% by weight of a first copolymerizable comonomer
III. 2 to 10% by weight of a second copolymerizable comonomer having a hydrophilic group.

The polymer of the invention comprises the product obtained by the polymerization of the foregoing compositions.

DETAILED DESCRIPTION

The ophthalmic devices of the present invention preferably exhibit an oxygen permeability of at least 10 Barrers when measured in accordance with the polarographic oxygen electrode method described by M. F. Refojo et al, "Permeability of Dissolved Oxygen Through Contact Lenses—1. Cellulose Acetate Butyrate", Cont. Intraocular Lens Med. J. 3(4), 27 (1977). More preferably the devices of the invention exhibit an oxygen permeability of at least 20 Barrers, and most preferably an oxygen permeability of at least 40 Barrers.

The devices of the invention preferably comprise a telechelic perfluoropolyether that has a backbone having a number average molecular weight between about 500 and 15,000 and has the formula

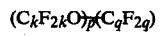

wherein p represents the number of —$C_kF_{2k}O$— subunits in said backbone and is an integer of from 3 to 200; q is an integer of from 1 to 4; and k may be the same or different within each of said —$C_kF_{2k}O$— subunits and is an integer of from 1 to 4. The —$C_kF_{2k}O$— and —$C_qF_{2q}$— subunits are randomly distributed in the backbone.

Most preferably the telechelic perfluoropolyether has the formula $$Q-X-Y-(C_kF_{2k}O)_p(C_qF_{2q})-Z$$

wherein
Q is selected from (A) $H_2C=\underset{R}{C}-\underset{O}{\overset{O}{C}}-O-$,    (B) $H_2C=\underset{R}{C}-\overset{O}{\overset{\|}{C}}NH-$, (C) $H_2C=\underset{R}{C}-CH_2-O-$, and (D) $H_2C=\underset{R}{C}-CH_2NH-$ wherein R is selected from hydrogen and methyl; X is selected from (E) a covalent bond    (F) $\text{+CH}_2)_a-\underset{O}{\overset{\|}{NHCO}}-$ (G) $\text{+CH}_2)_a-\overset{O}{\overset{\|}{OCNHR^1}}-\overset{O}{\overset{\|}{NHCO}}-$, (H) $-\overset{O}{\overset{\|}{CNHR^1NHCO}}-$, and (I) $-\overset{O}{\overset{\|}{CO}}-$;

wherein $R^1$ is selected from a divalent aliphatic group having from 2 to 14 carbon atoms, a divalent 5- or 6-membered cyclic group having from 5 to 14 carbon atoms, and an arylene group having from 6 to 14 carbon atoms, and a is an integer of from 2 to 12;
Y is selected from (J) $\text{+CH}_2)_b$,    (K) $\text{+CH}_2)_a-\overset{O}{\overset{\|}{OC}}-$, (L) $\text{+CH}_2)_a-\underset{R^2}{N}-\overset{O}{\overset{\|}{C}}-$, and (M) $-\overset{O}{\overset{\|}{C}}-$ wherein
$R^2$ is a lower alkyl group having 1 to 4 carbon atoms, a is an integer of from 2 to 12, and b is an integer of from 1 to 12; provided that when
(1) Q is (A), then X is selected from (E), (F), or (G) and Y is selected from (J), (K), or (L);
(2) Q is (B), then X is selected from (E), (F), or (G) and Y is selected from (J), (K), or (L);
(3) Q is (C) then either
  (i) X is (E) and Y is (M), or
  (ii) X is selected from (E), (F), (G), (H), or (I) and Y is selected from (J), (K), or (L); and
(4) Q is (D) then either
  (i) X is (E) and Y is (M), or
  (ii) X is selected from (H) and (I) and Y is selected from (J), (K), or (L); and Z is selected from $-OC_kF_{2k+1}$, and $-Q-X-Y-$ wherein Q, X, Y and k are as defined above.

Within the foregoing description, the following represents a particularly preferred telechelic perfluoropolyether:

$$Q-X-Y-CF_2-O\text{+}CF_2CF_2O)_m\text{+}CF_2O)_nC-F_2-Y-X-Q. \quad \text{(FORMULA 1)}$$

In this formula m and n are numbers providing a number average molecular weight of 500 to 15,000 to the backbone and independently have a value of from 1 to 120 and a sum of 7 to 120. The ratio m/n is from 0.2 to 5.0.

Specific examples of telechelic perfluoropolyethers of FORMULA 1 are $$H_2C=\underset{R}{C}-\overset{O}{\overset{\|}{CO}}-CH_2-CF_2O\text{+}CF_2CF_2O)_m\text{+}CF_2O)_nCF_2-CH_2-\overset{O}{\overset{\|}{OC}}-\underset{R}{C}=CH_2$$

or $$H_2C=\underset{R}{C}-\overset{O}{\overset{\|}{CO}}\text{+}CH_2)_2N\overset{O}{\overset{\|}{HCO}}-CH_2-CF_2O\text{+}CF_2CF_2O)_m\text{+}CF_2O)_nCF_2-CH_2-\overset{O}{\overset{\|}{OCNH}}\text{+}CH_2)_2O\overset{O}{\overset{\|}{C}}-\underset{R}{C}=CH_2$$

wherein R is hydrogen or methyl.

A number of other telechelic perfluoropolyethers of FORMULA 1 are useful in preparing the ophthalmic devices of the invention. They include $$CF_3O\text{+}CF_2\underset{CF_3}{CFO})_xCF_2-CH_2O-\overset{O}{\overset{\|}{C}}-CH=CH_2$$

$$CF_3O\text{+}CF_2CF_2O)_xCF_2CH_2O\overset{O}{\overset{\|}{C}}-NH\text{+}CH_2)_z O\overset{O}{\overset{\|}{C}}-\underset{CH_3}{C}=CH_2$$

$$CF_3O\text{+}C_3F_6O)_x\text{+}CF_2O)_yCF_2CH_2O\overset{O}{\overset{\|}{C}}NH-\underset{H_3C}{\overset{\phantom{X}}{\underset{\phantom{X}}{\text{⟨S⟩}}}}\overset{CH_3}{\underset{CH_2NHCO\text{+}CH_2)_2O\overset{O}{\overset{\|}{C}}-CH=CH_2}{\overset{CH_3}{\phantom{X}}}}$$

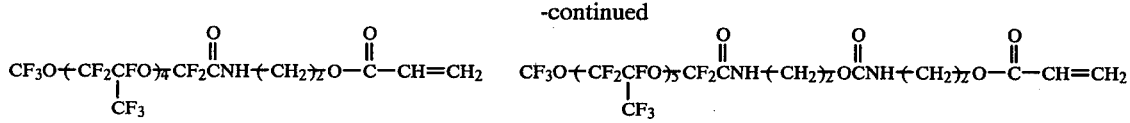
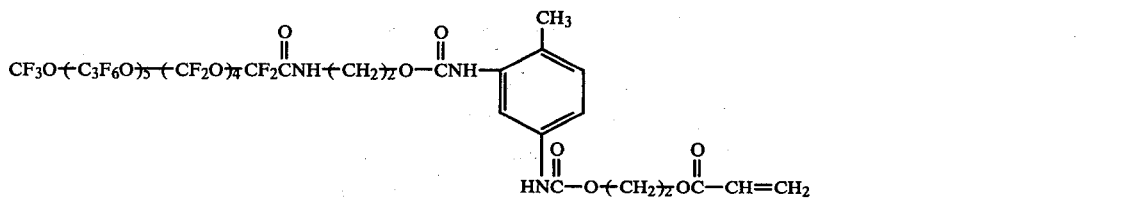
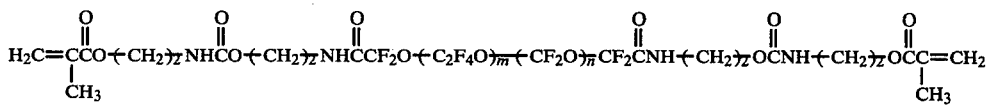
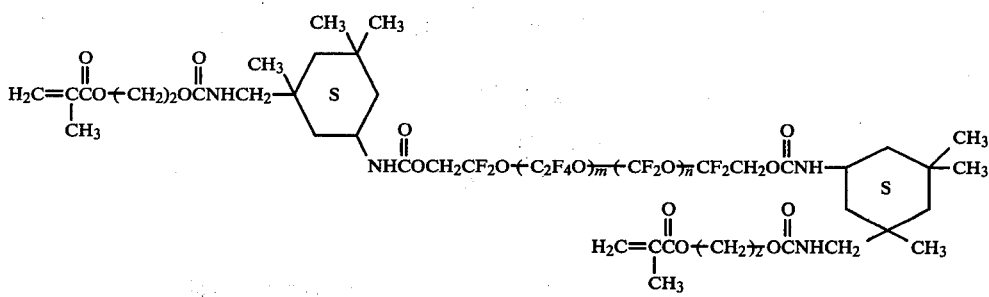
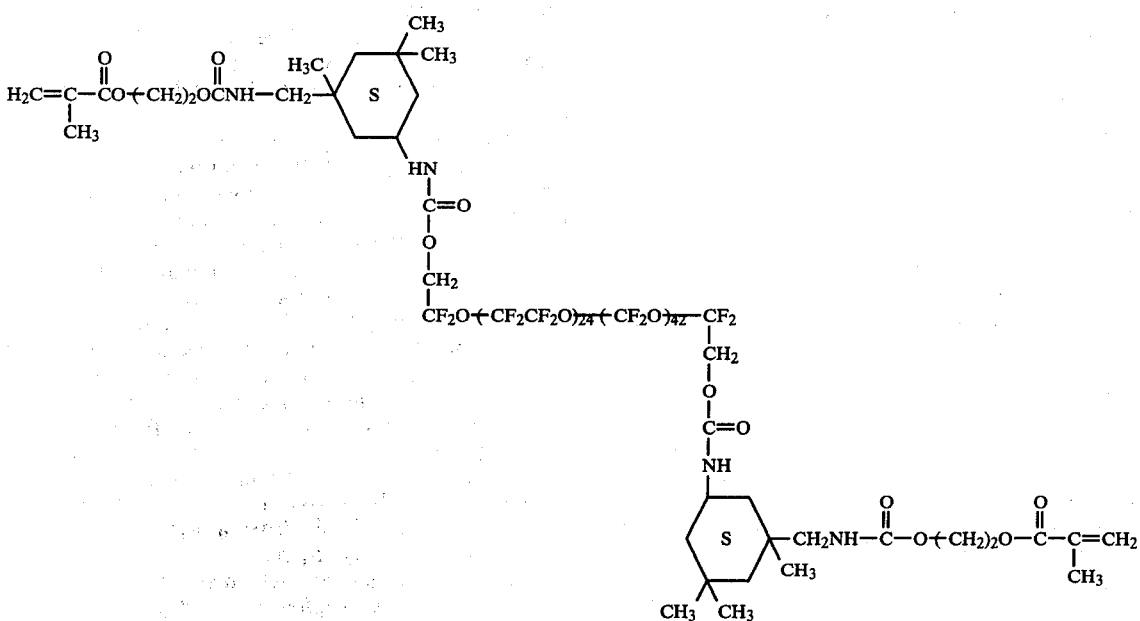
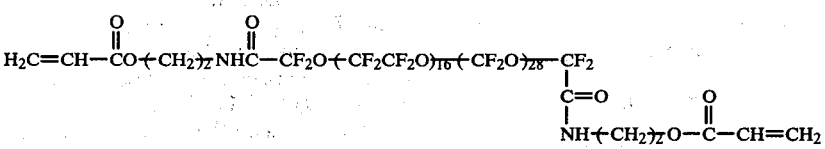
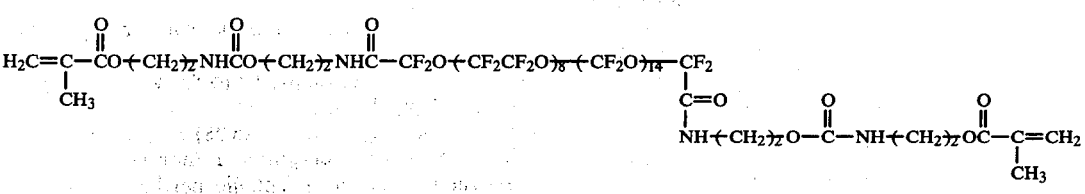

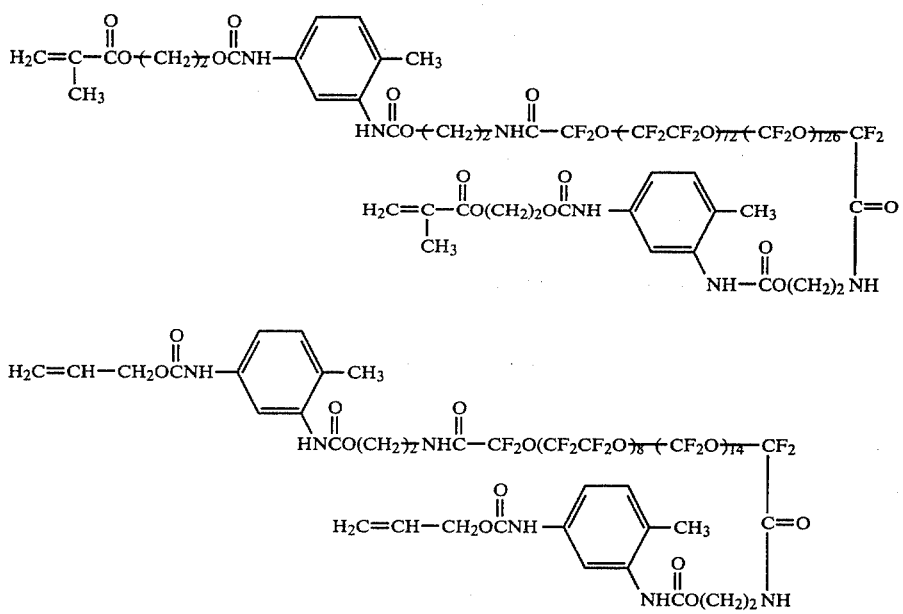

The telechelic perfluoropolyether utilized to make the ophthalmic devices of the present invention is preferably combined, prior to polymerization, with a compatible comonomer which is copolymerizable with the perfluoropolyether. The amount of compatible comonomer employed preferably comprises at least 2 weight percent of the combined weight of the perfluoropolyether and the comonomer. More preferably the comonomer comprises from about 2 to 50 weight percent of the combined weight of the perfluoropolyether and the comonomer. Most preferably the comonomer comprises from about 10 to 40 weight percent of the combined weight of the perfluoropolyether and the comonomer.

A variety of comonomers are useful for copolymerization with the telechelic perfluoropolyether. Such comonomers are characterized by having polymerizable ethylenically-unsaturated groups. Representative examples of useful ethylenically unsaturated comonomers include methyl and ethyl acrylate, methyl and ethyl methacrylate, cyclohexyl methacrylate, methyl 2-chloroacrylate, 2-ethoxyethyl methacrylate, 2,2,2-trifluoroethyl acrylate and methacrylate 2-cyanoethyl methacrylate, 2-(N-methylcarbomoyloxy)ethyl acrylate and methacrylate, acrylic acid, methacrylic acid, vinylidene chloride, vinylidene fluoride, methacryloyloxypropyl-tris(trimethylsilyl)siloxane, and methacryloyloxymethylpentamethyldisiloxane, and mixtures of two or more of these materials. Particularly preferred comonomers include methyl methacrylate, ethyl methacrylate, and cyclohexyl methacrylate.

A variety of other ingredients may be included in the polymerization mixture so as to either enhance or provide specific properties. For example, the dimensional stability of the devices of the invention may be enhanced by including in the polymerization mixture from about 0.5 to 25 parts by weight of a polyfunctional monomer per 100 parts by weight of polymerization mixture. Representative examples of useful polyfunctional monomers include ethyleneglycol diacrylate, ethyleneglycol dimethacrylate, diethyleneglycol dimethacrylate, allyl methacrylate, trimethylolpropane trimethacrylate, divinyl benzene, diallyl phthalate, and the polyacrylate and polymethacrylate esters of isocyanuric acids and s-triazines (e.g., tris(2-acryloyloxyethyl)isocyanuarate [available as "SR$^R$-368" from Sartomer Co., West Chester, PA]) and 1,3,5-tri(2-methacryloxyethyl)-s-triazine.

Wettability is a very important characteristic for ophthalmic devices such as contact lenses to possess in order to provide comfort and good visual acuity. Wettability can be improved (i.e., water contact angle brought to below about 50°) in a number of ways. For example, the telechelic perfluoropolyether can be polymerized with from about 2 to 10 parts by weight of the total weight of the polymerization mixture of a copolymerizable ethylenically-unsaturated monomer that has a hydrophilic group such as, for example, a hydroxy, carboxy, carbonamido sulfonyl, and sulfonamido groups. Representative examples of useful water-soluble, ethylenically-unsaturated monomers include 2-hydroxyethyl acrylate and methacrylate, 3-hydroxypropyl acrylate, 4-hydroxybutyl acrylate, 5-hydroxypentyl acrylate, 2,3-dihydroxypropyl acrylate and methacrylate, N-vinyl-2-pyrrolidone, 2-carboxyethyl acrylate, 2-carbonamidoethyl methacrylate, 2-sulfoethyl methacrylate, 2-sulfoamidoethyl acrylate, vinylsulfonic acid, and mixtures thereof.

Another technique for improving the wettability of the devices of the invention involves subjecting the surface of the device to the action of a glow discharge at a low pressure (e.g., 0.05 to 5 Torr) for from about 5 to 60 seconds in accordance with the disclosure in U.S. Pat. No. 3,940,207.

Particularly preferred compositions according to the invention comprise
 I. from 50 to 88 (preferably 67 to 83) weight percent of the telechelic perfluoropolyether
 II. from 10-48 (preferably 15 to 28) weight percent of the ethylenically unsaturated monomer copolymerizable with said telechelic perfluoropolyether and III. from 2 to 10 (preferably 2 to 8) weight percent of an ethylenically unsaturated monomer having hydrophilic groups copolymerizable with the telechelic perfluoropolyether.

The telechelic perfluoropolyethers useful in the invention include the perfluorinated polymers described, for example, in U.S. Pat. Nos. 3,505,229; 3,699,145; 3,810,874, 3,810,875; 3,814,741; and 3,882,193. The disclosures of these patents are incorporated herein by reference. These materials are characterized by possessing perfluoroxyalkylene units in this backbone.

The telechelic perfluoropolyethers useful in the inventon may be prepared by the reaction of a poly(perfluorooxyalkylene)alkanol or -diol or a poly(perfluorooxyalkylene)amidoalkanol or -diamidoalkanol or the corresponding amino or diamino compounds with the halide, anhydride, or lower alkyl ester of acrylic or methacrylic acid, or with an isocyanatoalkyl acrylate or methacrylate, or with the reaction product of one mole of an organic diisocyanate and one mole of a hydroxyalkyl acrylate or methacrylate. They may also be prepared by the reaction of a poly(perfluorooxyalkylene)-carbonyl halide or dicarbonyl halide with an alkyleneamine, such as allylamine.

The polymerization of the telechelic perfluoropolyether may be carried out by employing initiators which generate free-radicals on application of an activating energy as is conventionally used in the polymerization of ethylenically unsaturated monomers. Included among free-radical initiators are the conventional thermally activated initiators such as organic peroxides and organic hydroperoxides. Representative examples of such initiators include benzoyl peroxide, tertiary-butyl perbenzoate, diisopropyl peroxydicarbonate, cumene hydroperoxide, azobis(isobutyronitrile), and the like. Generally, from about 0.1 to 5 percent by weight of thermal initiator is used.

Photoinitiators may also be employed to initiate polymerization. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, nbenzoin ethyl ether, benzoin isopropyl ether, benzoin isobutyl ether and $\alpha$-methylbenzoin; diketones such as benzil and diacetyl, etc.; ketones such as acetophenone, $\alpha,\alpha,\alpha$-trichloroacetophenone, $\alpha,\alpha,\alpha$-tribromoacetophenone, $\alpha,\alpha$-diethoxyacetophenone (DEAP), 2-hydroxy-2-methyl-1-phenyl-1-propanone, o-nitro-$\alpha,\alpha,\alpha$-tribromoacetophenone, benzophenone and p,p'-tetramethyldiaminobenzophenone; $\alpha$-acyloxime esters such as benzil-(O-ethoxycarbonyl)-$\alpha$-monoxime; ketone/amine combinations such as benzophenone/N-methyldiethanolamine, benzophenone/tributylamine and benzophenone/Michler's ketone; and benzilketals such as benzildimethylketal, benzildiethylketal and 2,5-dichlorobenzildimethylketal. Normally, the photoinitiator is used in amounts ranging from about 0.01 to 5% by weight of the total oligomeric composition. When the quantity is less than 0.01% by weight, the photopolymerization rate becomes extremely low. If the photoinitiator is used in excess of 5% by weight, no correspondingly improved effect is observed. Preferably, about 0.25 to 1.0% of photoinitiator is used in the polymerizable compositions.

Polymerization may be carried out in bulk in a conventional manner. When the activating energy is ultraviolet light, the irradiation is typically carried out at a temperature of about 0° to 50° C. for 0.5 minute to 5 hours or more. Following ultraviolet irradiation, the composition may be heated at 50° to 100° C. to complete the polymerization.

When the activating energy is only heat, polymerization is usually carried out at a temperature from about 40° to 140° C. for about 5 to 50 hours. The polymerization can also be carried out in stages. Thus, in a first stage, the composition may be heated at 40° to 60° C. for about 5 to 25 hours, and in a second stage it may be heated at 50° to 100° C. for 5 to 25 hours. It is to be understood, of course, that the polymerization conditions are not limited to such temperature and time conditions nor to the use of ultraviolet or heat as the initiating energy.

The ophthalmic devices of the invention may be provided by supplying a mold of the desired configuration, charging the telechelic perfluoropolyether thereto, and causing polymerization to take place therein by, for example, one of the techniques previously described. Devices having the desired final configuration may be obtained in this manner. The resultant device may be machined and/or polished if desired using techniques known to the art.

Alternatively, the devices of the invention may be provided by polymerizing the telechelic perfluoropolyether into a rod, block, or sheet followed by cutting the device therefrom. This technique is useful when the polymerization product contains at least about 30 weight percent of the compatible comonomer copolymerizable with the perfluoropolyether.

The present invention is further described in the following representative examples. All temperatures are given in degrees Centigrade and all parts are given in parts by weight unless otherwise stated.

EXAMPLE 1

A hydroxyl-terminated perfluoropolyether having the formula HOCH$_2$—CF$_2$O-(-C$_2$F$_4$O)$_{\overline{m}}$(CF$_2$O)$_n$CF$_2$—CH$_2$—OH and a hydroxyl equivalent weight of about 1050 was prepared according to the procedures described in U.S. Pat. No. 3,810,874, Example VIII. A 250 ml bottle was charged with 222 g of this hydroxyl-terminated material, 32.0 g 2-isocyanatoethyl methacrylate, and 0.14 g dibutyltin dilaurate. The bottle was capped and shaken on a mechanical shaker for 20 hours, a mild exotherm being noted during the first hour. After shaking, an infrared spectrum taken of the cloudy reaction product indicated disappearance of isocyanate. The mixture was dissolved in 400 ml 1,1,2-trichloro-2,2,1-trifluoroethane (Freon-113) and washed successively with three portions of 100 ml water each. The Freon was stripped from the washed material, the residue shaken in a separatory funnel with 500 ml of FC-75 (a perfluorinated cyclic ether available from 3M Company) and the lower layer periodically withdrawn over a period of two days until no further separation occurred. Removal of solvent from the upper layer yielded 214 g of clear oil (n$_D^{22}$ 1.3337), identified by NMR as essentially pure telechelic perfluoropolyether having the formula

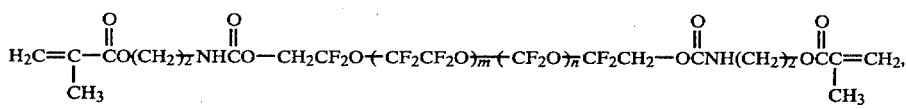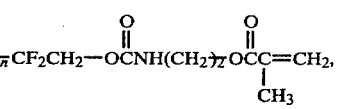

wherein m/n is about 0.6 and m is about 8.0. Removal of solvent from the lower layer yielded 37 g of cloudy oil ($n_D^{22}$ 1.3230) identified by NMR as

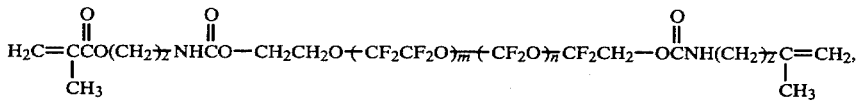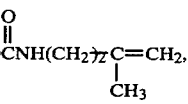

unreacted $HOCH_2-CF_2O+C_2F_4O)_m(CF_2O)_n$-$CF_2-CH_2OH$, and nonfunctional material having a perfluorooxyalkylene backbone.

EXAMPLE 2

A 25 cc round bottom flask, fitted with a magnetic stirrer and stopcock, was charged with 9.8 g of the telechelic perfluoropolyether dimethacrylate of Example 1, 0.2 g of methyl methacrylate and 0.05 g 2,2-diethoxyacetophenone. The mixture was stirred to effect solution and then frozen by immersing the flask in liquid nitrogen. The flask was evacuated for five minutes at a pressure of 1 Torr. The stopcock was then closed and the flask allowed to warm to room temperature. This freeze/thaw procedure was performed a total of three times in order to eliminate dissolved oxygen from the fluorocarbon monomer. The flask was then transferred to a nitrogen filled glove bag and a portion of the contents were charged into an ultraviolet transmissive contact lens mold by means of a syringe. After loading the lens mold, it was removed from the glove bag, suspended in a vertical position and subjected to radiation from a RS sunlamp positioned 18 cm away. After five minutes the lens mold was rotated 180° and irradiation continued for an additional 55 minutes. The mold was opened and the polymeric lens removed. It was soft, transparent, elastomeric, had a refractive index of $n_D^{23}$ 1.355 and an oxygen permeability of 115 Barrers, measured as disclosed in the specifications.

EXAMPLE 3

Example 2 was repeated using 10 g of the telechelic perfluoropolyether and none of the methyl methacrylate. The contact lens obtained was soft, transparent, and had $n_D^{23}$ 1.344 and an oxygen permeability of 125 Barrers.

EXAMPLE 4

A hydroxy-terminated perfluoropolyether having the same formula as given in Example 1 and having a hydroxyl equivalent weight of 400 was prepared according to the procedures described in U.S. Pat. No. 3,810,874, Example VIII. This material was used to prepare a telechelic perfluoropolyether having the formula

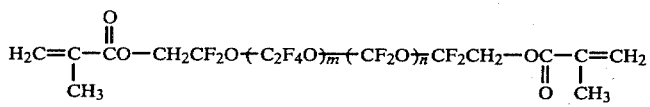

in which the ratio of m to n was 0.6 wherein m was about 3 and n was about 5. The telechelic perfluoropolyether was prepared by reaction of the hydroxy-terminated perfluoropolyether with methacryl chloride in accordance with the procedures described in Example XV of U.S. Pat. No. 3,810,874.

A contact lens prepared from the telechelic perfluoropolyether of Example 3 in accordance with the procedure of Example 2 was transparent, somewhat stiff, had and $n_D^{22}$ of 1.360, and had an oxygen permeability of 47 Barrers.

EXAMPLE 5

A series of mixtures of the telechelic perfluoropolyether of Example 1 and methyl methacrylate (MMA) were prepared to contain 0.5% by weight of 2,2-diethoxyacetophenone and deoxygenated as described in Example 2. The deoxygenated mixtures were transferred within a nitrogen filled glove bag by means of a syringe into individual sheet molds. The sheet molds consisted of two glass plates (each 15 cm×15 cm), covered on the inside by 100 micrometer thick poly(ethyleneglycolterephthalate) film, which was provided as a release surface. The plates were spaced apart by means of two layers of black vinyl electrical tape (total thickness, 375 μm) which had small channels on one side to permit loading through a syringe and to allow the escape of bubbles. After loading the molds, they were clamped together, suspended in a vertical position and subjected to radiation from a RS sunlamp positioned 18 cm away. After five minutes, the mold was rotated 180° and irradiation continued for an additional 55 minutes. The transparent molded polymers obtained were found to have the following properties:

| Wt. Ratio of Fluorinated Polymer to MMA | $n_D^{25a}$ | Tensile Strength[b] kg/cm² | Modulus[b] kg/cm² | Percent Elongation[b] | O₂ Permeability[c] (Barrers) |
|---|---|---|---|---|---|
| 80/20 | 1.38 | 169 | 2,960 | 45 | 60 |
| 70/30 | 1.40 | 201 | 5,780 | 55 | 30 |
| 50/50 | 1.43 | 254 | 9,860 | 45 | 10 |

[a]Measured according to ASTM D-542
[b]Measured according to ASTM D-882
[c]Measured according to Refojo et al, supra

EXAMPLE 6

A mixture of 7.0 g of the telechelic perfluoropolyether fluorinated polymer of Example 3, 3.0 g methyl methacrylate, and 0.02 g diisopropyl peroxydicarbonate were mixed and deoxygenated according to the procedure of Example 2. The mixture was transferred, in a nitrogen filled glove bag, into a glass vial (14 mm inside diameter × 50 mm long). The vial was capped and heated in an oven at 30° C. for 24 hours followed by heating at 50° C. for an additional 24 hours. The resulting clear polymer plug was found to have a Shore D hardness of 50 and was machined by conventional means into contact lenses.

EXAMPLE 7

Example 6 was repeated using a mixture of 5.0 g of the telechelic perfluoropolyether of Example 3, 5.0 g methyl methacrylate and 0.02 g diisopropyl peroxydicarbonate. The clear plug obtained was easily machined by conventional means into contact lenses.

EXAMPLE 8

A mixture of 7.0 g of the telechelic perfluoropolyether of Example 1, 3.0 g methyl methacrylate, 0.8 g hydroxyethyl methacrylate, and 0.06 g 2,2-diethoxyacetophenone was polymerized according to the procedure of Example 5. The improved wettability of this polymer was demonstrated by measuring the water contact angle after soaking the polymer in water for a period of five days. A value of 45° was obtained. A similar polymer, not containing hydroxyethyl methacrylate was found to have a value of 59°.

EXAMPLE 9

A polymer was prepared from a mixture of 5.0 g of the telechelic perfluoropolyether of Example 1, 5.0 g

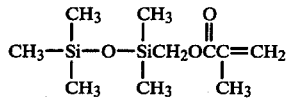

according to the procedure of Example 5. The resulting transparent polymer was found to have an oxygen permeability of 53 Barrers and an $n_D^{23}$ of 1.356.

EXAMPLE 10

A mixture of 7.0 g of the telechelic perfluoropolyether of Example 1, 2.0 g N-vinylpyrrolidone, 1.0 g methyl methacrylate and 0.05 g 2,2-diethoxyacetophenone was polymerized according to the method of Example 5. The resulting transparent polymer was found to have the following properties: tensile strength—105 kg/cm$^2$, modulus—1060 kg/cm$^2$, elongation—41%, $n_D^{25}$—1.403, H$_2$O contact angle—24° and oxygen permeability of 36 Barrers.

EXAMPLE 11

A lens was prepared according to the procedure of Example 2 from a mixture of 8.0 g of the telechelic perfluoropolyether of Example 1, 2.0 g vinylidene chloride and 0.05 g 2,2-diethoxyacetophenone according to the method of Example 2. The contact lens obtained was soft and transparent and had an oxygen permeability of 140 Barrers and an $n_D^{23}$ of 1.385.

EXAMPLE 12

A mixture of 8.0 g of the telechelic perfluoropolyether of Example 1, 2.0 g methacrylic acid and 0.05 g 2,2-diethoxyacetophenone was polymerized by the procedure described in Example 5. The transparent polymer obtained had a tensile strength of 235 kg/cm$^2$, an elongation of 46%, an oxygen permeability of 73 Barrers and an $n_D^{23}$ of 1.389.

EXAMPLE 13

A mixture of 7.0 g of a telechelic perfluoropolyether having the structure

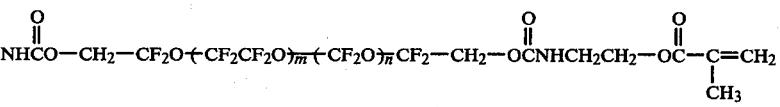

wherein m/n=about 0.7, m is about 15, n is about 21, and the formula weight of the perfluoropolyether is 4000, 3.0 g methyl methacrylate and 0.05 g 2,2-diethoxyacetophenone was polymerized by the procedure of Example 5. A transparent film was obtained having an $n_D^{23}$ of 1.394, a tensile strength of 150 kg/cm$^2$, an elongation of 78%, a modulus of 3320 kg/cm$^2$ and an oxygen permeability of 95 Barrers.

EXAMPLE 14

A mixture of 4.8 g of the telechelic perfluoropolyether of Example 1, 1.2 g methyl methacrylate, 1.2 g

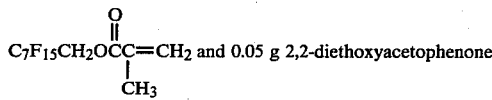

(Sylkem 21, trademark of Dow Corning) and 0.04 g 2,2-diethoxyacetophenone was polymerized according to the procedure of Example 4. A transparent sheet was obtained, the polymer of which had a tensile strength of 150 kg/cm$^2$, an elongation of 78% and an oxygen permeability of 96 Barrers, and $n_D^{23}$ of 1.404.

EXAMPLE 15

A mixture of 7.27 g of the telechelic perfluoropolyether of Example 1, 2.19 g methyl methacrylate, 0.54 g hydroxyethyl methacrylate, and 0.05 g 2,2-diethoxyacetophenone was prepared for polymerization via the freeze/thaw technique described in Example 2. The flask was transferred to a nitrogen filled glove bag and a portion of the contents were charged by means of a syringe into a contact lens mold. The mold material was suitably transparent to ultraviolet radiation, thus the mixture was allowed to polymerize for one hour under low intensity ultraviolet irradiation. The resultant lens was transparent, flexible, bubble free and had an oxygen permeability of 48 Barrers, and an $n_D^{23}$ of 1.395.

EXAMPLE 16

The 70/30 copolymer film of Example 5 was evaluated for adsorption of tear protein as follows. A simulated tear solution was prepared which contained the following components for each liter of aqueous solution:

| | |
|---|---|
| 8.4 g | sodium chloride |
| 0.08 g | calcium chloride |
| 1.38 g | sodium phosphate (pH 7.4) |
| 0.075 g | glutamic acid |
| 1.7 g | lysozyme |
| 3.9 g | albumin |
| 1.05 g | gamma globulin |

Radioactive proteins were prepared by mixing 5 mg of each protein with 100 µCi of $^3$H-N-succinimidyl propionate and storage of the reaction mixture at 0° C. for one hour. N-succinimidyl propionate that was not covalently attached to the protein was separated from the protein by gel permeation chromatography.

Three tear solutions were prepared. Each solution had only one protein component which was radioactive; the other two protein components were not radioactive.

Samples of polyhydroxyethyl methacrylate (pHEMA) sheets and the 70/30 copolymer were cut into 0.4 cm² pieces and equilibrated in saline (8.3 g sodium chloride/1.0 liter water).

The polymer samples were individually placed in separate vials, each containing 0.4 ml of the tear solution. A 20 µl aliquot of lipid mixture was layered on top of the aqueous layer. The composition of the lipid mixture was as follows:

| | | |
|---|---|---|
| Butyl stearate | 0.23 | µg |
| Cholesteryl oleate | 0.16 | µg |
| Cholesteryl palmitate | 0.16 | µg |
| Tripalmitin | 0.04 | µg |
| Cetyl alcohol | 0.03 | µg |
| Oleic acid | 0.1 | µg |
| Lecithin | 0.16 | µg |

The vials were placed in a shaker apparatus in a water bath which was maintained at 37° C. Polymer samples were soaked for one day. At the end of the time period, the polymer samples were removed from the sample vials and rinsed with saline. The polymer material was

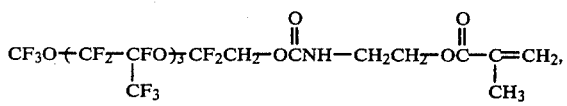

placed in a scintillation vial and counted for tritium content. Using this procedure, the amount of protein deposited on the polymer material was determined to be as follows:

TABLE II

| | mg Protein/cm² Polymer | |
|---|---|---|
| Protein | 70/30 Copolymer | pHEMA |
| Albumin | 0.90 | 3.5 |
| Gamma globulins | 0.30 | 2.5 |
| Lysozyme | 0.48 | 3.0 |

These data show that the amount of protein adsorbed to the 70/30 copolymer is much less than the amount of protein which adsorbed to HEMA.

EXAMPLE 17

A mixture of 7.27 g of the telechelic perfluoropolyether of Example 1, 2.19 g methyl methacrylate, 0.54 g 2-hydroxyethyl methacrylate, and 0.05 g 2-hydroxy-2-methyl-1-phenyl-1-propanone was prepared for polymerization by the freeze/thaw technique of Example 2. The composition was then polymerized to a film as described in Example 5. Its tensile strength was 140 kg/cm², elongation 41%, modulus of elasticity 4015 kg/cm², and $n_D^{25}$ 1.410. The film had a water contact angle of 47° and an oxygen permeability of 45 Barrers.

EXAMPLE 18

A mixture of 4.8 g of a telechelic perfluoropolyether having the formula,

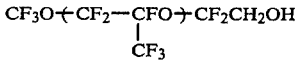

and 0.03 g 2,2-diethoxyacetophenone was polymerized according to the procedure described in Example 5. The resulting clear transparent film obtained had an oxygen permeability of 117 Barrers, $n_D^{25}$ 1.365, tensile strength of 23.5 kg/cm², and an elongation of 65%.

The telechelic perfluoropolyether was prepared by the reaction of 2-isocyanatoethyl methacrylate with

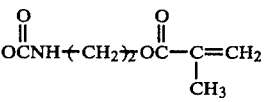

as described in Example 1. The clear oil isolated had $n_D^{23}$ 1.3449. Its identity was established by NMR.

EXAMPLE 19

A mixture was prepared to contain (a) 6.0 g telechelic perfluoropolyether having the formula,

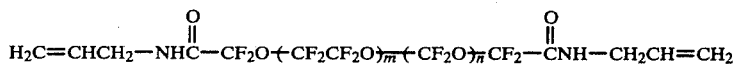

in which m/n is 0.6 and m is 8.3 and n is 13.9, (b) 3.0 g telechelic perfluoropolyether having the formula

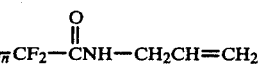

in which m/n is 0.6, m is 8.3 and n is 13.9, (c) 3.0 g of methyl methacrylate, and (d) 0.25 g 2,2-diethoxyacetophenone.

A mixture was polymerized in accord with the procedure described in Example 4. A clear transparent film was obtained which had a tensile strength of 135 kg/cm² and an oxygen permeability of 63 Barrers.

The first of the above telechelic perfluoropolyethers was prepared by the procedure described in Example 1 by the reaction of a hydroxyl-terminated perfluoropolyether of the formula shown in which m=8.3 with 2-isocyanatoethyl methacrylate. The second of the two telechelic perfluoropolyethers was prepared by the reaction in accordance with the procedure described in Example 1 of U.S. Pat. No. 3,810,874 by the reaction of allylamine with the methyl ester of the perfluoropolyether having the formula

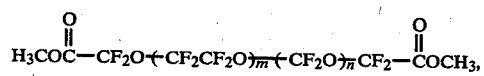

the preparation of which is also taught in U.S. Pat. No. 3,810,874. The diallyl amide obtained had the formula

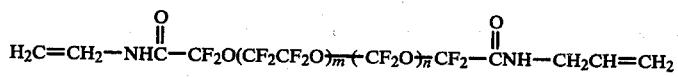

in which m/n is 0.6, m is 8.3 and n is 13.9.

We claim:

1. An ophthalmic device selected from the group consisting of a contact lens and a corneal implant and comprising a polymer of a telechelic perfluoropolyether having a backbone of perfluorooxyalkylene units, a number average molecular weight between about 500 and 15,000, and at least one polymerizable ethylenically unsaturated group wherein said telechelic perfluoropolyether has the formula Q—X—Y—$(C_kF_{2k}O)_p(C_qF_{2q})$—Z wherein p represents the number of —$C_kF_{2k}O$— subunits in said backbone and is an integer of from 3 to 200, q is an integer of from 1 to 4, and k may be the same of different within each of said —$C_kF_{2k}O$— subunits and is an integer of from 1 to 4 wherein Q is selected from

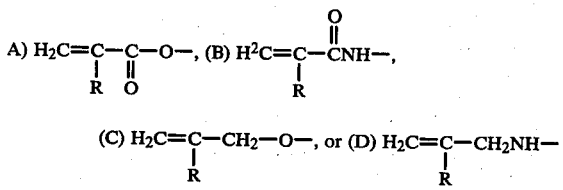

wherein R is selected from hydrogen or methyl; wherein X is selected from (E) a covalent bond,

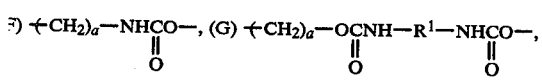

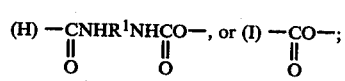

wherein $R^1$ is selected from a divalent aliphatic group having from 2 to 14 carbon atoms, a divalent 5- or 6-membered cyclic group having from 5 to 14 carbon atoms, or an arylene group having from 6 to 14 carbon atoms, and a in an integer of from 2 to 12; wherein Y is selected from (J) —$(CH_2)_b$,

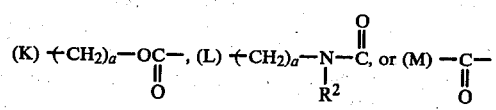

wherein $R^2$ is a lower alkyl group having 1 to 4 carbon atoms, a is an integer of from 2 to 12, and b is an integer of from 1 to 12; provided that when (1) Q is (A), then X is selected from (E), (F), or (G) and Y is selected from (J), (K), or (L);
(2) Q is (B), then X is selected from (E), (F), or (G) and Y is selected from (J), (K), or (L);
(3) Q is (C) then either
  (i) X is (E) and Y is (M), or
  (ii) X is selected from (E), (F), (G), (H), or (I) and Y is selected from (J), (K), or (L); and
(4) Q is (D) then either
  (i) X is (E) and Y is (M), or
  (ii) X is selected from (H) or (I) and Y is selected from (J), (K), or (L); and wherein Z is selected from —$OC_kF_{2k+1}$, or Q—X—Y— wherein Q, X, Y and k are as defined above.

2. An ophthalmic device according to claim 1 wherein said telechelic perfluoropolyether has the formula

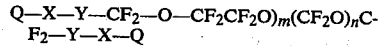

wherein m and n are numbers providing a number average molecular weight of 500 to 15,000 to the backbone of said telechelic perfluoropolyether, and wherein m and n independently have a value of from 1 to 120 and a sum of 7 to 120, and wherein the ratio m/n is from 0.2 to 5.0.

3. An ophthalmic device according to claim 2 wherein said telechelic perfluoropolyether has the formula

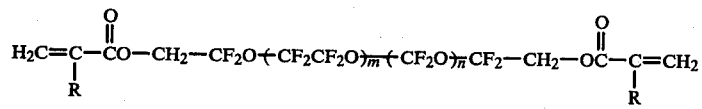

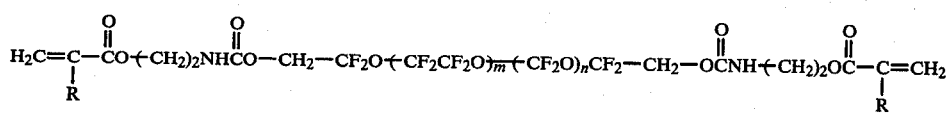

wherein R is hydrogen or methyl.

4. An ophthalmic device according to claim 3 wherein said telechelic perfluoropolyether is copolymerized with from 2 to 50 weight percent of a compatible ethylenically unsaturated comonomer copolymerizable therewith.

5. An ophthalmic device according to claim 4 wherein said ethylenically unsaturated monomer is selected from methyl and ethyl acrylate, methyl and ethyl methacrylate, cyclohexyl methacrylate, methyl 2-chloroacrylate, 2-ethoxyethyl methacrylate, 2,2,2-trifluoroethyl acrylate and methacrylate, 2-cyanoethyl methacrylate, 2-(N-methylcarbamoyloxy)ethyl acrylate and methacrylate, acrylic acid, methacrylic acid, vinylidene chloride, vinylidene fluoride, methacryloyloxypropyl-tris(trimethylsilyl)siloxane, methacryloyloxymethylpentamethyldisiloxane, or mixtures thereof.

6. An ophthalmic device according to claim 5 wherein said ethylenically unsaturated comonomer is selected from methyl methacrylate, ethyl methacrylate, or cyclohexyl methacrylate.

7. An ophthalmic device according to claim 6 wherein said ethylenically unsaturated monomer is methyl methacrylate.

8. An ophthalmic device according to claim 6 further comprising an additional monomer selected from 2-hydroxyethyl acrylate and methacrylate, 2,3-dihydroxypropyl acrylate and methacrylate, or N-vinyl-2-pyrrolidone, and mixtures thereof.

9. An ophthalmic device according to claim 8 wherein said additional monomer is N-vinyl-2-pyrrolidone.

10. An ophthalmic device according to claim 8 wherein said additional monomer is 2-hydroxyethyl methacrylate.

11. An ophthalmic device according to claim 5 further comprising a third monomer selected from ethylene glycol diacrylate, ethyleneglycol dimethacrylate, diethyleneglycol dimethacrylate, allyl methacrylate, trimethylolpropane trimethacrylate, divinyl benzene, diallyl phthalate, tris(2-acryloyloxyethyl)isocyanurate, or 1,3,5-tri(2-methacryloxyethyl)-s-triazine.

12. A contact lens according to claim 1.

13. An ophthalmic device selected from the group consisting of a contact lens and a corneal implant and comprising the polymerization product of a composition of I. from 50 to 88 weight percent of a telechelic perfluoropolyether having a formula selected from

or

wherein R is hydrogen or methyl, m and n are numbers providing a number average molecular weight of 500 to 15,000 to the backbone of said telechelic perfluoropolyether and have a value of 1 to 120 and a sum of 7 to 120, and wherein the ratio m/n is from 0.2 to 5;

II. from 10 to 48 weight percent of a first monomer copolymerizable with said telechelic perfluoropolyether, said first monomer being selected from methyl methacrylate, ethyl methacrylate, or cyclohexyl methacrylate; and III. from 2 to 10 weight percent of an ethylenically unsaturated monomer having hydrophilic group copolymerizable with the telechelic perfluoropolyether.

14. An ophthalmic device according to claim 13 wherein said comonomer having hydrophilic group is selected from 2-hydroxyethyl methacrylate, N-vinyl-2-pyrrolidone, or combinations thereof.

* * * * *

UNITED STATES PATENT AND TRADEMARK OFFICE
CERTIFICATE OF CORRECTION

PATENT NO. : 4,440,918  Page 1 of 2
DATED : April 3, 1984
INVENTOR(S) : David E. Rice and Jay V. Ihlenfeld It is certified that error appears in the above-identified patent and that said Letters Patent is hereby corrected as shown below:

Col. 1, line 26, "indequate" should read --inadequate--.

Col. 2, last full sentence should read --The $-C_kF_{2k}O-$ subunits, to the extent they differ from one another, are randomly distributed in the backbone.--.

Col. 3, line 3, "$Q-X-Y-(C_kF_{2k}O)_p-(C_qF_{2q}-Z$" should read -- $Q-X-Y-(C_kF_{2k}O)-(C_qF_{2q})-Z$ --.

Col. 7, line 32, "perferably" should read --preferably--.

Col. 8, line 32, "isocyanuarate" should read --isocyanurate--.

Col. 9, line 11, "perfluoroxyalkylene" should read --perfluorooxyalkylene--.

Col. 9, line 47, "nben-" should read -- ben- --.

Col. 16, line 59, "A" should read --The--.

UNITED STATES PATENT AND TRADEMARK OFFICE
CERTIFICATE OF CORRECTION

PATENT NO. : 4,440,918

DATED : April 3, 1984

INVENTOR(S) : David E. Rice and Jay V. Ihlenfeld

It is certified that error appears in the above-identified patent and that said Letters Patent is hereby corrected as shown below:

Col. 17, line 35, Structure (B) should read 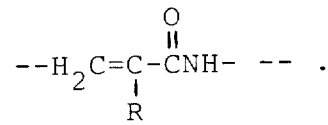.

Signed and Sealed this

*Twelfth* Day of *March 1985*

[SEAL]

Attest:

DONALD J. QUIGG

*Attesting Officer*     *Acting Commissioner of Patents and Trademarks*